United States Patent [19]

Jensen

[11] 4,294,071

[45] Oct. 13, 1981

[54] HYDRAULIC BOOSTER TRAVEL RATIO CHECK VALVE

[75] Inventor: Kenneth D. Jensen, Owosso, Mich.

[73] Assignee: Midland-Ross Corporation, Cleveland, Ohio

[21] Appl. No.: 102,883

[22] Filed: Dec. 12, 1979

[51] Int. Cl.³ .......................... B60T 13/00; B60T 11/20
[52] U.S. Cl. ...................................... 60/547 A; 60/562; 60/574
[58] Field of Search ....................... 91/460, 441, 391 R, 91/373, 372; 60/547 R, 562, 574, 547 A

[56] References Cited

U.S. PATENT DOCUMENTS

| | | | |
|---|---|---|---|
| 2,134,780 | 11/1938 | Doyle | 60/574 |
| 2,941,368 | 6/1960 | Porter | 60/574 |
| 3,793,829 | 2/1974 | Swanson | 60/547 R |
| 3,838,629 | 10/1974 | Meyers | 91/460 |
| 3,899,889 | 8/1975 | Swanson et al. | 60/547 R |
| 4,237,772 | 12/1980 | Peegles | 91/460 |
| 4,241,642 | 12/1980 | Peegles | 91/460 |

Primary Examiner—Paul E. Maslousky
Attorney, Agent, or Firm—Richard A. Negin

[57] ABSTRACT

The present invention is an improved hydraulic booster in which there is a ratio chamber between a power piston and a slave piston. The ratio chamber communicates with a low pressure fluid source through a check means which allows fluid from the low pressure fluid source to flow into the ratio chamber and prevents higher pressure fluid in the ratio chamber from flowing to the low pressure source. The check means can also be modified to allow air to be bled from the low pressure chamber.

16 Claims, 9 Drawing Figures

HYDRAULIC BOOSTER TRAVEL RATIO CHECK VALVE

BACKGROUND OF THE INVENTION

This invention is in the field of hydraulic boosters; more particularly, the invention relates to the travel ratio feature of the hydraulic booster.

It is known in the art that hydraulic boosters contain a travel ratio feature by which the movement of an input means is translated to even greater movement of an output means. In hydraulic boosters for use with motor vehicle power braking systems, the movement of the input rod in response to the operator stepping on the brake pedal is translated into an even greater movement of the output rod. This translation is measured by the travel ratio, that is, the ratio of movement of the output rod to the movement of the input rod. Typical systems with hydraulic booster pedal travel controls are shown in U.S. Pat. Nos. 3,793,829 and 3,899,889.

The mechanical advantage as measured by a travel ratio can be attained in a hydraulic booster by use of a ratio chamber between a slave piston and a power piston which is connected to the output means.

When the input means is activated, the slave piston and the power piston move toward the output. The relative sliding movement between the power piston and the slave piston results from a change in the geometry of the ratio chamber. The ratio chamber containing an incompressible fluid is sealed at a constant volume. The geometry of the ratio chamber changes and results in greater movement of the slave piston relative to the movement of the power piston.

When there is no pressure for power assist by the hydraulic booster and the system is in manual mode, the power piston and slave piston move together and the ratio chamber decreases in volume. Fluid leaves the ratio chamber through a seal means which allows fluid to leave but not enter the ratio chamber. When the manual mode is released, the power piston and slave piston tend to return to the neutral position and the ratio chamber volume increases. The increase in volume results in a pressure drop. In prior art systems, this lower pressure exists until the ratio chamber reaches a point where it communicates with a supply opening so that fluid can be supplied to the ratio chamber and return it to proper pressure.

In the prior art system if the brake is not returned to the neutral mode and power assist braking mode becomes effective, the smaller volume of the ratio chamber results in a lower travel ratio. Further, even if the booster is in power assist mode, there is an initial operation before the ratio chamber and the supply opening communication is broken, when the advantage of the travel ratio is not effective since the ratio chamber loses volume to the supply opening. It is desirable to improve hydraulic boosters having the travel ratio feature to overcome these difficulties of the prior art systems.

SUMMARY OF THE INVENTION

The present invention is an improved hydraulic booster in which there is a ratio chamber between a power piston and a slave piston. The ratio chamber communicates with a low pressure fluid source through a check means which allows fluid from the low pressure fluid source to flow into the ratio chamber and prevents higher pressure fluid in the ratio chamber from flowing to the low pressure source. The check means can also be modified to allow air to be bled from the low pressure chamber.

It is generally the object of the present invention to provide a hydraulic booster in which there is immediate and maximum use of the travel ratio feature. It is a feature of the present invention to supply fluid to the ratio chamber while going to neutral mode from manual mode. An advantage of the present invention is that immediate use can be made of the travel ratio feature in the power assist mode.

It is an object of this invention to obtain one or more of the objects set forth above. These and other objects and advantages of this invention will become apparent to those skilled in the art from the following specification and claims, reference being had to the attached drawings.

BRIEF DESCRIPTION OF THE DRAWING

Corresponding elements in different figures have the same reference characters.

DESCRIPTION OF THE PREFERRED EMBODIMENTS

Figure 1:
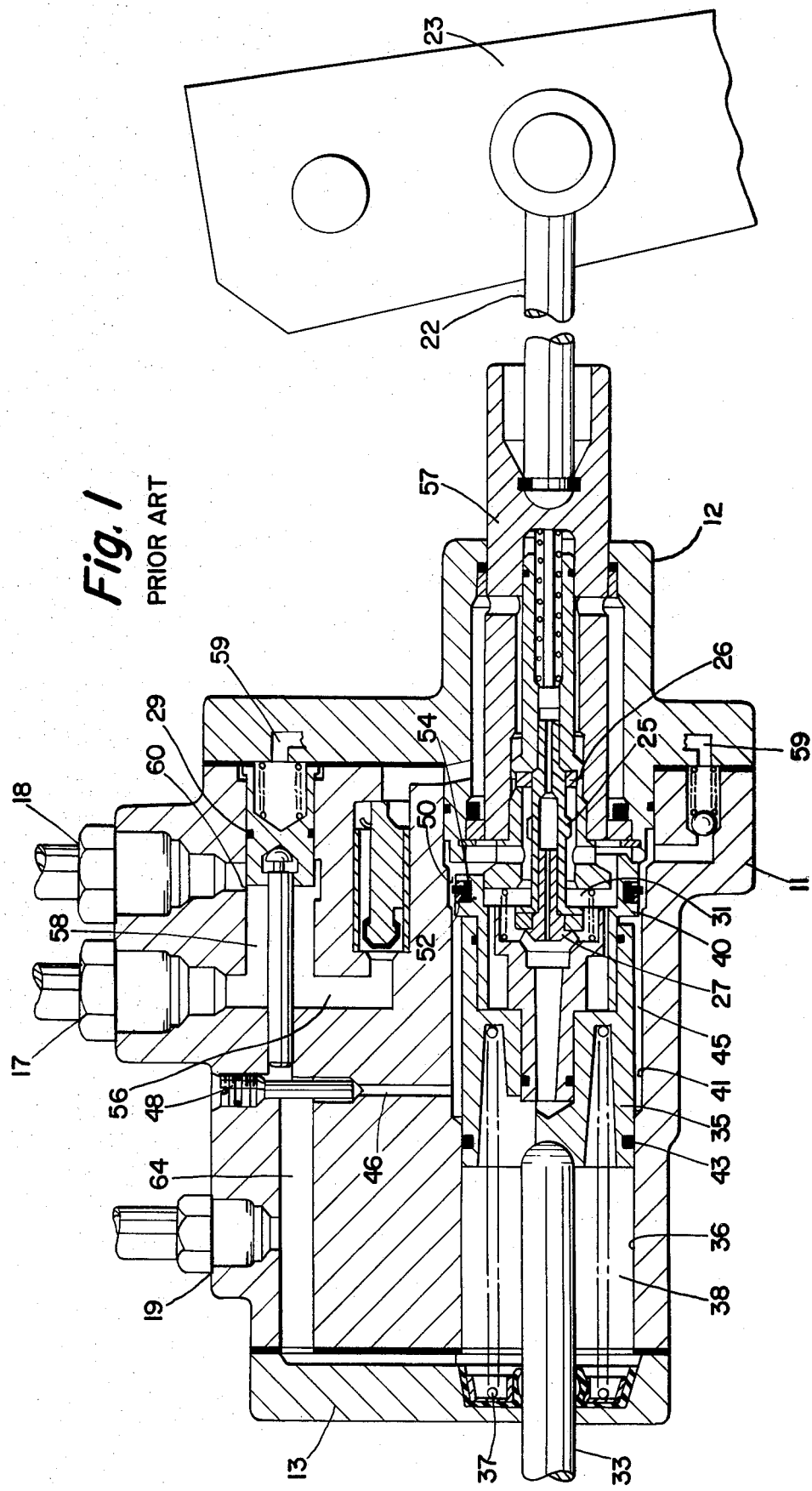
FIG. 1 is a sectional view of a prior art hydraulic booster.
Figure 2:
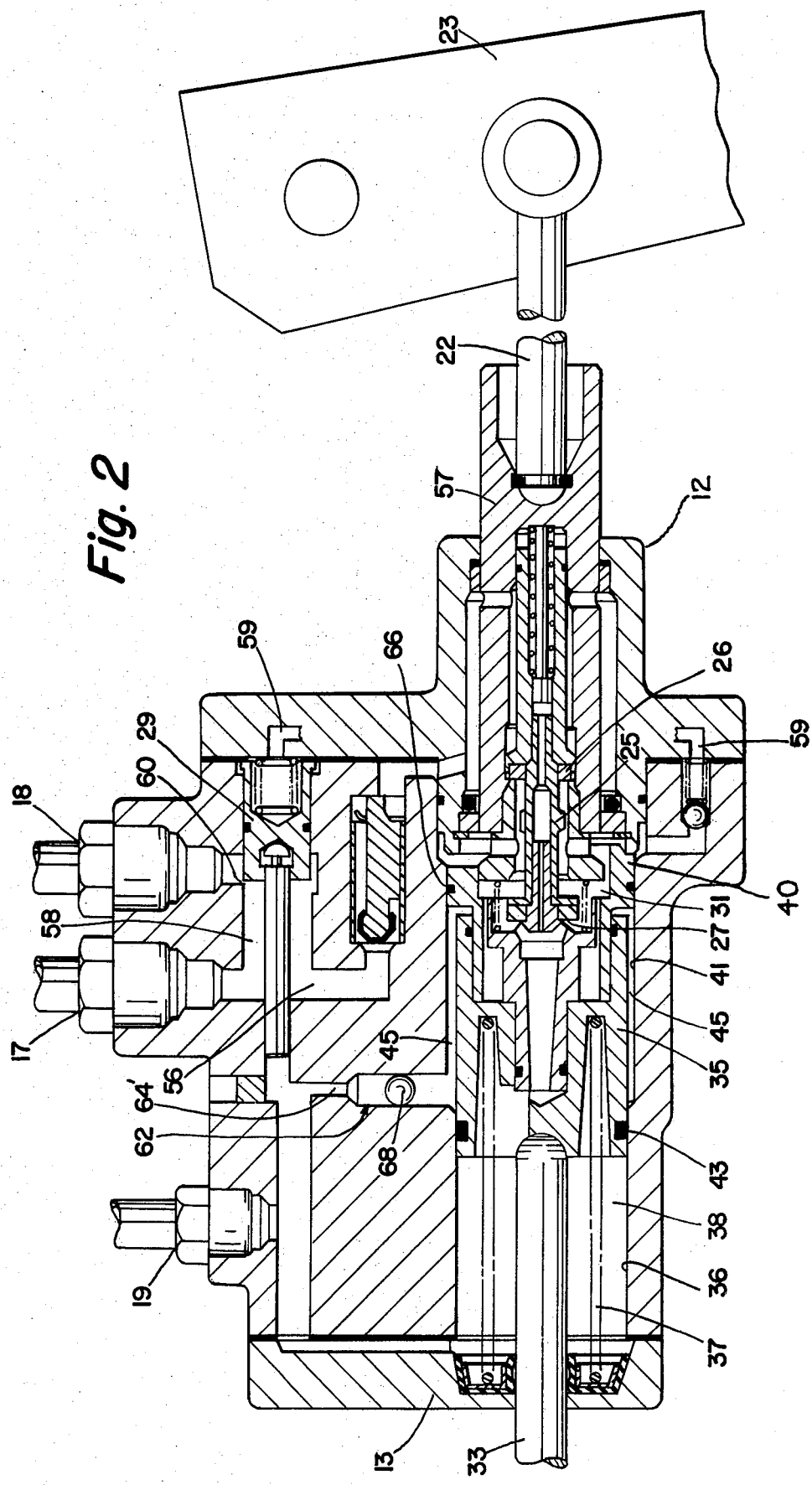
FIG. 2 is a sectional view of a hydraulic booster containing the present invention.

The present invention will be understood by those skilled in the art by having reference to FIGS. 1 and 2 which are sectional views of a hydraulic booster. The improvement of the present invention, as shown in FIG. 2, will be more easily understood by first referring to FIG. 1 which is a schematic drawing of a prior art hydraulic booster which can be used in the power steering of a motor vehicle. Although this particular hydraulic booster is used to illustrate the present invention, it is understood that the improvement of the present invention can generally be used in hydraulic boosters having the travel ratio feature to be described.

The hydraulic booster has a housing 11 having an input end 12 and an output end 13. There is a housing inlet 17 connected to a pumping means such as a power steering pump. A housing outlet 18 can be connected to a power steering gear. Additionally, there is a low pressure outlet 19 which can be connected to a reservoir for the power steering pump.

The input means is an input rod 22 operatively connected to brake pedal 23. The input rod is operatively connected through the input end 12 of the housing to control valve assembly 25, in part schematically illustrated, having an inlet valve 26 and an exhaust valve 27. Such control valve assemblies are known in the art.

Examples are given in U.S. Pat. Nos. 3,793,829 and 3,899,889 which relate to pedal travel control and pedal ratio control. Further reference is made to such a control valve as shown in "Hydraulic Power Brake Booster for Small Cars" by Kenneth B. Swanson published by the Society of Automotive Engineers Incorporated, 400 Commonwealth Drive, Warrendale, Pa. 15096.

The hydraulic booster has a passage 56 in the booster from the inlet 17 to the inlet valve 26. A power piston 40 is slidingly located within power piston bore 41 of the housing 11. There is a power piston chamber 31 in the output end side of the inlet valve 26 and between the power piston 40 and the input end 12. The power piston chamber 31 communicates with inlet 17 through passages in the hydraulic booster.

A gain valve means 29 communicates with housing inlet 17 through passage 58. During power assist operation, there is fluid flow from inlet 17, through passage 58, gain valve gap 60 and out of outlet 18. When the brakes are applied, the inlet valve 26 opens and there is communication from the inlet 17 through passage 56 to passage 59 to the back side of gain valve 29 causing gap 60 to be restricted. This increases the pressure in the system when there is communication to the passage between the pumping means and gap 60. This increased pressure is transferred to power piston chamber 31 for power assist through passage 56 which communicates to passage 58 between inlet 17 and gain valve gap 60.

An output means such as output rod 33 extends from the output end 13 of the housing 11. The output rod 33 is connected to a slave piston 35, slidingly located in slave piston bore 36. The slave piston bore 36 is a cylindrical bore having a diameter slightly greater than that of the slave piston 35 which it slidingly receives. There is a sealing means such as O-ring 43 between the inner wall of slave piston bore 36 and the slave piston 35. A biasing means such as spring 37 within an output end chamber 38 biases the slave piston 35 toward the input end 12 and causes the slidable elements within the hydraulic booster to move into the neutral position as shown in FIG. 1 when the brake pedal 23 is not activated.

A ratio chamber 45 is located between slave piston 35, power piston 40 and the inner wall of bore 41. A passage such as radial passage 46 is connected from ratio chamber 45 to a bleeder means such as bleeder screw 48. This radial passage can be used as a means to bleed the ratio chamber of trapped air when necessary but is sealed during operation of the booster. There is an annular cavity 50 within the bore 41. The cavity is located at the end of bore 41 and in the wall of the bore which defines power piston chamber 31. As shown in FIG. 1, the outer surface 52 of the power piston overlaps between the outer wall of bore 41 and annular cavity 50. There is a lip seal 54 which permits fluid flow only in a direction from the ratio chamber 45 to the power piston chamber 31 when the lip seal 54 slides into bore 41 and is not bypassed by annular cavity 50.

Figure 6:
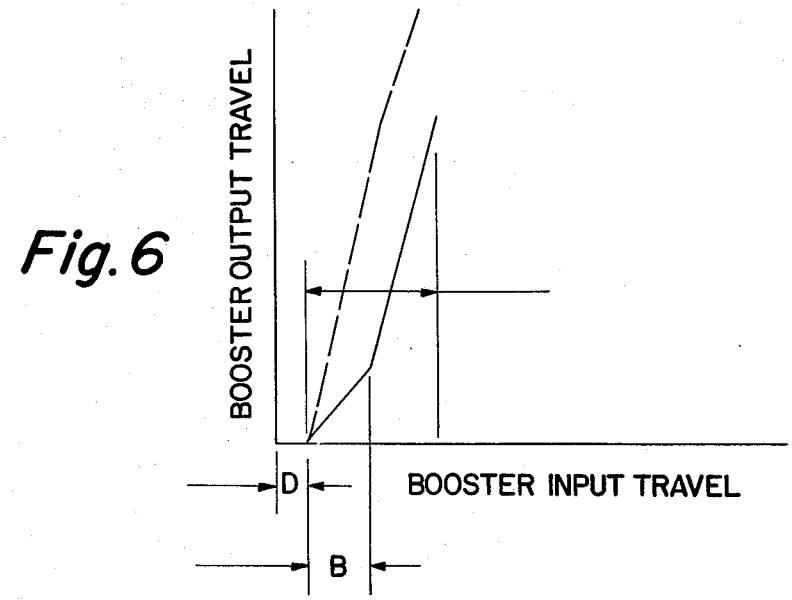
FIG. 6 is a graph of Output Travel vs. Input Travel showing performance of a prior art hydraulic booster and the hydraulic booster of the present invention.

The pedal ratio control feature of the prior art hydraulic booster as shown in FIG. 1 operates during power assist braking. When the brake pedal is actuated, the input rod 22 travels into the hydraulic booster. During initial pedal application, the reaction plunger 57 and the control valve assembly 25 move toward the output end 13 a first distance D as shown in FIG. 6, which is a curve of the Booster Output Travel vs. the Booster Inlet Travel. During travel through the distance D, the exhaust valve 27 seats on the power piston assembly and a lap condition exists where both the inlet 26 valve and exhaust 27 valve are closed. Travel up to this point results in no output travel. Further travel of the reaction plunger allows the inlet valve 26 of the control valve assembly 25 to open, feeding high pressure fluid into the power piston chamber 31 providing power assist. As long as the input force from the brake pedal is greater than the force generated against the reaction plunger 57, the inlet valve 26 remains open and the hydraulic booster provides additional power assist.

Prior to movement of the power piston 40, the power piston chamber 31 is in communication with the ratio chamber 45 through annular cavity 50, which can also be a flute in the main bore. While communication is maintained between the power piston chamber 31 and ratio chamber 45 through the annular cavity 50, fluid can flow from the ratio chamber 45 to the power piston chamber 31, or from the power piston chamber 31 to the ratio chamber 45. After the movement of the power piston 40, through a distance B, toward the output end 13, the annular cavity 50 becomes sealed from the ratio chamber 45 by lip seal 54. If the fluid pressure in ratio chamber 45 is greater than the pressure in the power piston chamber 31, fluid can pass over the lip seal 54 from the ratio chamber 45 into the power piston chamber 31. However, fluid can no longer pass from the power piston chamber 31 to the ratio chamber 45.

The slave piston 35 movement toward the output end 13 relative to the power piston 40 toward the output, i.e., the ideal travel ratio, is not attained until the ratio chamber 45 is sealed from the power piston chamber 31. Referring to FIG. 6, the solid line, showing the prior art design, indicates that there is no output while the booster assembly is traveling through distance D. There is approximately a one-to-one ratio from the booster output travel to the booster input travel through distance B with the power piston chamber 31 being connected to the ratio chamber 45 via annular cavity 50. In essence, the travel ratio feature has little or no effect and the power piston 40 pushes the slave piston 35. Instead of the power piston 40 separating from the slave piston 35 to maintain the volume of ratio chamber 45, as the slave piston 35 slides into slave piston bore 36, the volume of the ratio chamber actually decreases with excess fluid moving past annular cavity 50 into the power piston chamber until the power piston 40 moves through a distance B.

When the brake is used in manual mode, the power piston 40 and the slave piston 35 move as one unit and the volume of ratio chamber 45 decreases. The excess fluid leaves the ratio chamber 45 over lip seal 54. Upon release of the brake, spring 37 returns the assembly back to neutral position, and the ratio chamber 45 increases back to its normal size for power assist application. The additional volume in the prior art booster of FIG. 1 is made by the creation of a vacuum or reduced pressure in ratio chamber 45. When the power piston 40 encounters annular cavity 50, fluid on the power piston chamber side of annular cavity 50 flows through the annular cavity 50 to fill the ratio chamber 45 with fluid until the pressure in the two chambers is equal.

If, for some reason, after a manual mode application, power assist braking is applied before lip seal 54 returns to annular cavity 50, the ratio chamber has a smaller volume than the power assist mode is designed for. The travel ratio is less than when the full ratio chamber is used. The travel ratio feature and, therefore, the power assist feature, are not fully effective.

A sectional view of a hydraulic booster containing the present invention is shown in FIG. 2. A check valve means such as ball valve 62 allows flow in a direction from low pressure outlet 19, through line 64′, ball valve 62 and into ratio chamber 45. The check valve 62 prevents fluid flow in a direction from ratio chamber 45 into line 64′. An annular cavity 50, as shown in FIG. 1, is not used in the hydraulic booster with the present invention. There is a sealing means such as a lip seal 66, schematically illustrated and well known in the art, between the outer surface of power piston 40 and the inner surface of power piston bore 41. The lip seal allows flow in a direction from the ratio chamber 45 to the power piston chamber 31.

The ball valve 62 has a ball valve seat 72. There is a stop means such as stop 69 between the ball valve seat 72 and the ratio chamber 45. Ball 68 is between the ball valve seat and the stop 69.

Figure 3:
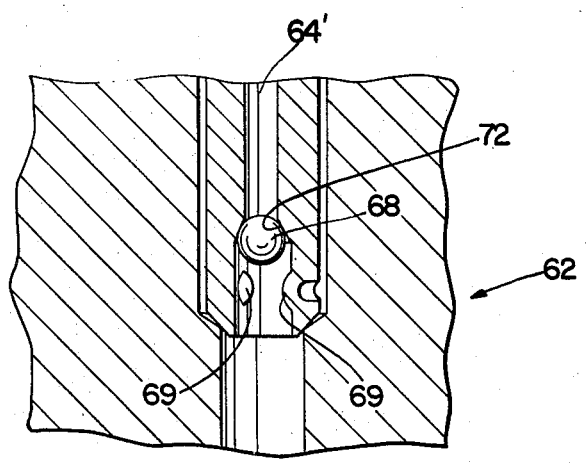
FIG. 3 is an enlarged sectional view of the check valve of the present invention in a closed position.

During normal operation when the power piston 40 is forced in the output direction, the pressure in the power piston chamber 31 will be greater than the pressure in the ratio chamber 45. The movement of the power piston 40 toward the output end 13 results in a compression of the fluid in the ratio chamber 45. This compression causes the ball 68 of ball valve 62 to seat and prevent the loss of fluid from the ratio chamber 45, as shown in FIG. 3. Because the ratio chamber 45 becomes sealed from the power piston chamber 31, the travel ratio feature becomes effective almost immediately as shown by the dotted line in FIG. 6. The only deviation expected is any initial leakage around the ball 68 of the ball valve 62 before it seats.

Figure 4:
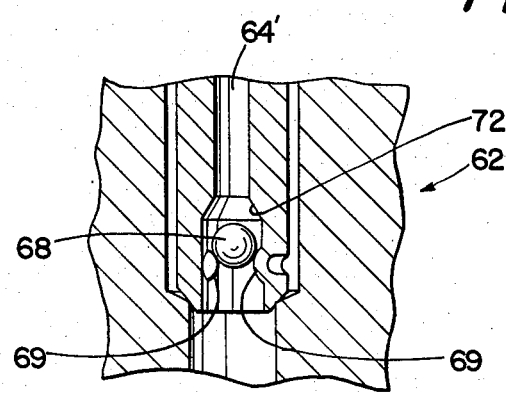
FIG. 4 is an enlarged sectional view of the check valve of the present invention in a feed position.

With the present invention, annular cavity 50 will be eliminated. When the brake is used in manual mode, the volume of the ratio chamber 45 decreases as with the embodiment shown in FIG. 1. The excess fluid passes from the ratio chamber 45 to the power piston chamber 31 over lip seal 66. Upon release of the brake, as in the prior art, spring 37 returns the assembly back to neutral position, and the ratio chamber 45 increases back to size for power assist application. While the assembly returns to a neutral mode upon release of the brake pedal during manual modes, fluid necessary to fill the increasing ratio chamber 45 is supplied through reservoir line 64′, past ball valve 62 and into ratio chamber 45 as shown in FIG. 4. Stop 69 prevents ball 68 from leaving the seating area of check valve 62 and falling into ratio chamber 45.

Figure 5:
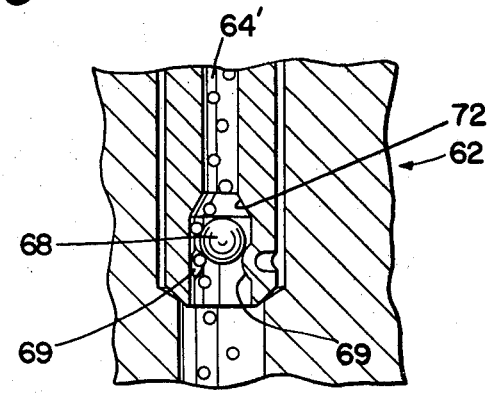
FIG. 5 is an enlarged sectional view of the check valve of the present invention in bled position.

The use of check valve 62 allows the ratio chamber 45 to be bled of any air it may contain without the use of an additional bleeder means such as bleeder screw 48 shown in FIG. 1. This is accomplished when the pressure in the ratio chamber 45 side of the check valve 62 and the pressure in the reservoir line 64′ from the check valve 62 are equal. In this situation, ball 68 unseats allowing entrained air to escape as shown in FIG. 5. Stop 69 prevents ball 68 from leaving the seating area of check valve 62 and falling into ratio chamber 45.

Figure 7:
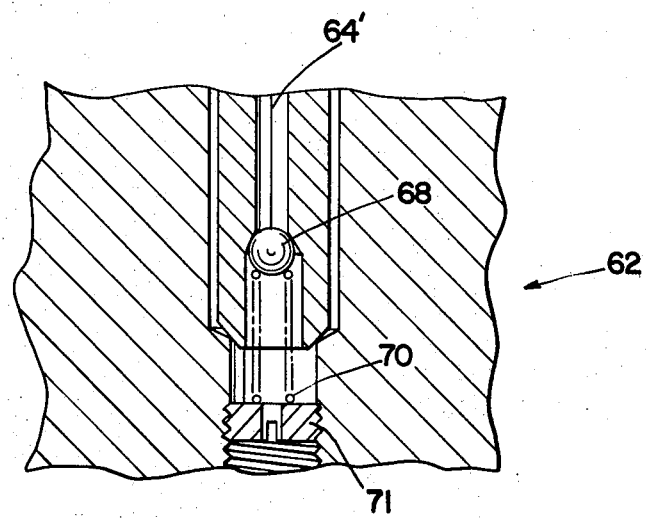
FIG. 7 shows an alternate embodiment of a check valve used with the present invention.

An alternate embodiment of the ball valve 62 which can be used in this invention is shown in FIG. 7. In this embodiment, the ball valve 62 can be spring loaded so that low pressure fluid is not fed into the ratio chamber 45 until there is sufficient pressure difference across the ball valve to overcome a spring means such as spring 70. Spring 70 is located between ball 68 and spring stop 71. The ball 68 is biased so that ball valve 62 is closed when no other forces act on ball 68. Only when the pressure in ratio chamber 45 results in a force on the ball 68 from the reservoir line 64′ great enough to overcome the spring force does the spring 70 compress and the ball valve 62 open. In this way, the ratio chamber is sealed from the reservoir during neutral modes until a predetermined pressure difference exists between the ratio chamber and reservoir line 64′.

Figure 8:
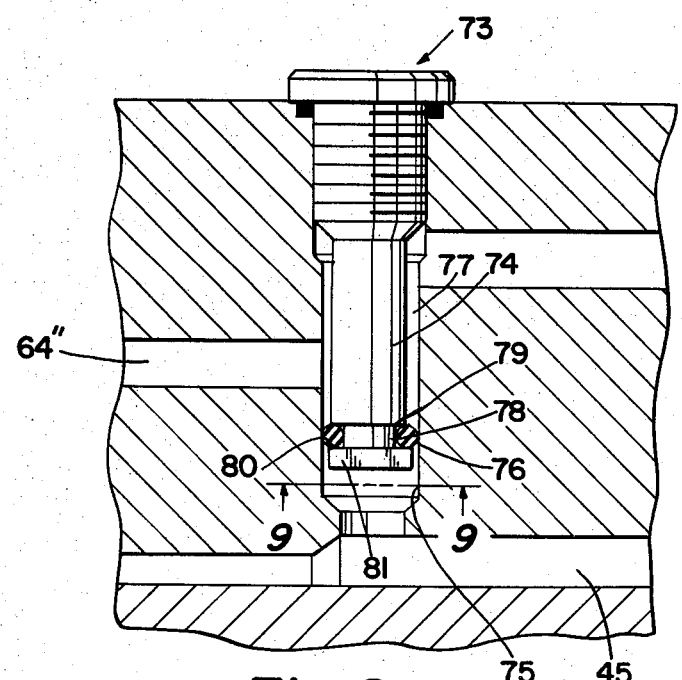
FIG. 8 is an alternate embodiment of the present invention.
Figure 9:
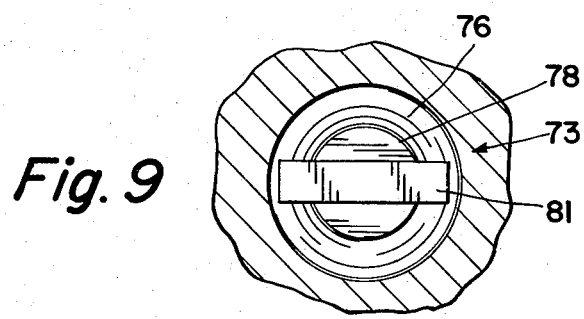
FIG. 9 is a sectional view of the embodiment shown in FIG. 8 along line 9—9.

An alternate embodiment of the check valve means is shown in FIGS. 8 and 9. This embodiment is a modified bleeder screw 73 having an extension 74 located in a line 75 between ratio chamber 45 and reservoir line 64″ which communicates to the low pressure outlet 19 in a similar manner as reservoir line 64 in FIG. 1. There is an O-ring seal 76 between the inner walls of line 75 and extension 74 located between the reservoir line 64 and the ratio chamber 45. A space 77 is between extension 74 and the inner wall of line 75. The O-ring 76 is set in an annular chamber 78 in the extension 74. The low pressure outlet 19 side of the channel 78 extends as a low pressure ledge 79 completely around the extension 74. Therefore, if the pressure in ratio chamber 45 is greater than in reservoir line 64, the O-ring 76 is forced against ledge 79 and the inner wall of line 75 sealing the ratio chamber 45. The ratio chamber 45 side ledge 80 of channel 78 extends less than completely around the extension 74. As shown in FIG. 9, the ratio chamber side ledge 80 can be more than one holding lip such as the two holding lips 81 which are 180° apart and hold the O-ring 76 in place. Therefore, if the pressure in the reservoir line 64 is greater than the pressure in the ratio chamber 45, a flexible O-ring 76 allows fluid to pass from reservoir line 64 to the ratio chamber 45. This O-ring check means performs in the hydraulic booster in the same manner as the ball type check valve described with reference to FIGS. 2 through 5. In this embodiment, however, the modified bleeder screw 73 must be removed to bleed air from the system. Bleeders, such as bleeder screw 48 in FIG. 1, do not allow the passage of fluid in the manner of the bleeder screw 73 shown in FIGS. 8 and 9.

Modification, changes, and improvements to the preferred forms of the invention herein disclosed, described and illustrated may occur to those skilled in the art who come to understand the principles and precepts thereof. Accordingly, the scope of the patent to be issued hereon should not be limited to the particular embodiments of the invention set forth herein, but rather should be limited by the advance of which the invention has promoted the art.

What is claimed is:

1. A hydraulic booster comprising:
   a housing having an input end and an output end, the housing having a housing inlet, a housing outlet and a low pressure outlet;
   a control valve means, within the housing, having an inlet valve and an exhaust valve;
   an input means through the input end, the input means being operatively connected to the control valve means;
   a gain valve means in communication with a passage from the housing inlet to the housing outlet, at a gain valve gap;
   a power piston chamber on the output end side of the inlet valve of the control valve means, the power piston chamber connected through the inlet valve to the passage from the housing inlet to the gain valve gap;

power piston slidingly located with a power piston bore in the housing between the power piston chamber and the output end;

a slave piston slidingly located within a slave piston bore in the housing between the power piston and the output end;

an output means from the output end operatively connected to the slave piston;

a ratio chamber within the housing between the slave piston and power piston, there being a passage between the ratio chamber and the low pressure outlet;

a check valve means disposed in the passage between the ratio chamber and the low pressure outlet and designed to allow fluid, under pressure, to flow through the passage in only one direction towards the ratio chamber, the check valve being designed to prevent the loss of fluid from the ratio chamber when the power piston moves in the direction of the output means.

2. The hydraulic booster as recited in claim 1 wherein the check valve means is a ball valve.

3. The hydraulic booster as recited in claim 2 wherein the check valve allows air to be bled from the ratio chamber when the pressure on the ratio chamber side of the check valve is equal to the pressure on the low pressure outlet side of the check valve.

4. The hydraulic booster as recited in claim 2 wherein the ball valve further comprises:
a ball valve seat;
a stop means between the ball valve seat and the ratio chamber;
a ball between the ball valve seat and the stop.

5. The hydraulic booster as recited in claim 4 further comprising a spring between the stop means and the ball.

6. The hydraulic booster as recited in claim 2 further comprising a seal between the ratio chamber and the power piston chamber which seals in a direction from the power piston chamber to the ratio chamber and allows flow from the ratio chamber to the power chamber.

7. The hydraulic booster as recited in claim 6 wherein the seal is a lip seal.

8. The hydraulic booster as recited in claim 1 wherein the check valve means is a modified bleeder screw further comprising:
an extension into a line between the ratio chamber and the low pressure outlet, there being a space between the extension and the inner wall of the line;
an O-ring located between the inner wall of the line and the extension in an annular channel in the extension, the annular channel having a low pressure ledge between the annular channel and the low pressure outlet, the low pressure ledge extending completely around the extension, the annular channel having a ratio chamber side ledge between the annular channel and the ratio chamber, the ratio chamber side ledge extending less than completely around the extension.

9. The hydraulic booster as recited in claim 8 wherein the ratio side ledge is more than on holding lip.

10. The hydraulic booster as recited in claim 9 wherein there are two holding lips 180° apart.

11. The booster of claim 1, wherein the check valve means includes a spherical ball, means cooperating with the ball for sealing the passageway, and means for maintaining the ball in the fluid passageway.

12. The booster of claim 11, wherein the sealing and maintaining means includes a valve seat formed by an annular restriction in the fluid passageway and at least one stop projecting into the fluid passageway in spaced relation from the valve seat, the seat being closer to the low pressure outlet than the stop.

13. The booster of claim 12, which includes means for biasing the ball against the valve seat.

14. The hydraulic booster of claim 1, wherein the check valve means includes:
a bleeder screw comprising a cylindrical extension in the fluid passageway, the extension having a smaller diameter than the fluid passageway, such that an annular space exists between the extension and adjacent wall of the fluid passageway;
a resilient deflectable O-ring surrounding the extension and sealing the space between the extension and adjacent wall of the fluid passageway; and
means for preventing deflection of the O-ring in the direction of the low pressure outlet and allowing deflection of the O-ring in the direction of the bore, whereby fluid, under pressure, is allowed to flow through the fluid passageway in only one direction towards the bore so that there will be no loss of fluid in the bore when the power piston is actuated.

15. The hydraulic booster of claim 14, wherein the means for allowing and preventing deflection of the O-ring includes an annular channel for receiving the O-ring, the annular channel having a continuous ledge abutting one side of the O-ring and a discontinuous ledge abutting another opposite side of the O-ring, the continuous ledge being closer to the low pressure outlet.

16. The hydraulic booster of claims 13 or 15 which includes means coacting between the power piston and adjacent wall of the bore to seal the space therebetween.

* * * * *